United States Patent
Sone

(10) Patent No.: US 11,188,278 B2
(45) Date of Patent: Nov. 30, 2021

(54) COMPUTER-READABLE MEDIUM, MOBILE TERMINAL, AND METHOD FOR INFORMING USER OF UPDATABILITY OF PROGRAM

(71) Applicant: BROTHER KOGYO KABUSHIKI KAISHA, Nagoya (JP)

(72) Inventor: Tatsuhiko Sone, Nagoya (JP)

(73) Assignee: Brother Kogyo Kabushiki Kaisha, Nagoya (JP)

(*) Notice: Subject to any disclaimer, the term of this patent is extended or adjusted under 35 U.S.C. 154(b) by 0 days.

(21) Appl. No.: 16/832,480

(22) Filed: Mar. 27, 2020

(65) Prior Publication Data

US 2020/0310707 A1  Oct. 1, 2020

(30) Foreign Application Priority Data

Apr. 1, 2019 (JP) .............................. JP2019-069843

(51) Int. Cl.
*G06F 3/12* (2006.01)

(52) U.S. Cl.
CPC ............ *G06F 3/1225* (2013.01); *G06F 3/123* (2013.01); *G06F 3/1205* (2013.01)

(58) Field of Classification Search
CPC ....... G06F 3/1225; G06F 3/1205; G06F 3/123
See application file for complete search history.

(56) References Cited

U.S. PATENT DOCUMENTS

| 2016/0337544 | A1  | 11/2016 | Han |
| 2017/0168805 | A1* | 6/2017  | Yin .......................... G06F 8/65 |
| 2017/0223127 | A1* | 8/2017  | Matsutani .......... H04N 1/00344 |

FOREIGN PATENT DOCUMENTS

JP    2016-212855 A    12/2016

* cited by examiner

*Primary Examiner* — Moustapha Diaby
(74) *Attorney, Agent, or Firm* — Scully, Scott, Murphy & Presser, PC

(57) ABSTRACT

A non-transitory computer-readable medium stores computer-readable program instructions executable by a controller of a mobile terminal. The program instructions are configured to, when executed, cause the controller to control a device to perform image data processing, obtain, in response to receipt of an update notification from a server via a communication interface, the update notification, the update notification representing that the program instructions are updatable and containing urgency level information representing an urgency level showing how urgently the program instructions need to be updated, determine whether user informing conditions concerning the obtained update notification are satisfied, the user informing conditions being satisfied depending on the urgency level, and display, when determining that the user informing conditions are satisfied, an update object representing that the program instructions are updatable.

17 Claims, 8 Drawing Sheets

< INFORMING DETERMINATION TABLE >

| URGENCY LEVEL | USE LOG OF UPDATE-INFLUENCED DEVICE | INFORMING NEEDED LEVEL |
|---|---|---|
| HIGH | — | 3 |
| MIDDLE | There is a use log of an update-influenced device used within one year before receipt of the update notification. | 3 |
| MIDDLE | There is no use log of an update-influenced device used within one year before receipt of the update notification. | 2 |
| LOW | There is a use log of an update-influenced device used within one month before receipt of the update notification. | 3 |
| LOW | There is a use log of an update-influenced device used within one year before receipt of the update notification. | 2 |
| LOW | There is no use log of an update-influenced device used within one year before receipt of the update notification. | 1 |

FIG. 2

COMPUTER-READABLE MEDIUM, MOBILE TERMINAL, AND METHOD FOR INFORMING USER OF UPDATABILITY OF PROGRAM

CROSS-REFERENCE TO RELATED APPLICATION

This application claims priority under 35 U.S.C. § 119 from Japanese Patent Application No. 2019-069843 filed on Apr. 1, 2019. The entire subject matter of the application is incorporated herein by reference.

BACKGROUND

Technical Field

Aspects of the present disclosure are related to a non-transitory computer-readable medium, a mobile terminal, and a method for informing a user of updatability of a program.

Related Art

An information processing apparatus has been known that is configured to display, in response to receiving from a server an update notification representing that a program is updatable to a new version, a screen for informing a user of the received update notification.

SUMMARY

When the information processing apparatus is further configured to provide, each time receiving such an update notification, a message for prompting the user to update the program regardless of what kind of update is contained in the new version, the user might feel annoyed at the repeated messages.

To address the above problem, for instance, the information processing apparatus may be configured to send to the server an inquiry about whether the program is updatable, then receive a notification about the updatability of the program from the server as a response to the inquiry, and inform the user of the updatability of the program based on the received notification.

However, when the user is informed of the updatability of the program in response to the server receiving the inquiry from the user, the program might be used over a long period of time without being updated even though the program needs to be updated as soon as possible after a critical problem has been found in the program.

Aspects of the present disclosure are advantageous to provide one or more improved techniques to appropriately inform a user that a program is updatable and prevent the user from being annoyed when inappropriately informed of updatability of the program.

According to aspects of the present disclosure, a non-transitory computer-readable medium is provided, which stores computer-readable program instructions executable by a controller of a mobile terminal. The mobile terminal includes a display and a communication interface configured to perform data communication with a server. The program instructions are configured to, when executed by the controller, cause the controller to control a device to perform image data processing, obtain, in response to receipt of an update notification from the server via the communication interface, the received update notification, the update notification representing that the program instructions are updatable to a new version and containing urgency level information, the urgency level information representing an urgency level showing how urgently the program instructions need to be updated to the new version, determine whether user informing conditions concerning the obtained update notification are satisfied, the user informing conditions being satisfied depending on the urgency level represented by the urgency level information, and control, when determining that the user informing conditions are satisfied, the display to display an update object representing that the program instructions are updatable to the new version.

According to aspects of the present disclosure, further provided is a mobile terminal that includes a display, a communication interface configured to perform data communication with a server, a storage storing program instructions, and a controller. The controller is configured to, when executing the program instructions, control a device to perform image data processing, obtain, in response to receipt of an update notification from the server via the communication interface, the received update notification, the update notification representing that the program instructions are updatable to a new version and containing urgency level information, the urgency level information representing an urgency level showing how urgently the program instructions need to be updated to the new version, determine whether user informing conditions concerning the obtained update notification are satisfied, the user informing conditions being satisfied depending on the urgency level represented by the urgency level information, and control, when determining that the user informing conditions are satisfied, the display to display an update object representing that the program instructions are updatable to the new version.

According to aspects of the present disclosure, further provided is a method implementable on a controller of a mobile terminal in accordance with program instructions stored in a storage of the mobile terminal. The method includes controlling a device to perform image data processing, obtaining, in response to receipt of an update notification from a server via a communication interface of the mobile terminal, the received update notification, the update notification representing that the program instructions are updatable to a new version and containing urgency level information, the urgency level information representing an urgency level showing how urgently the program instructions need to be updated to the new version, determining whether user informing conditions concerning the obtained update notification are satisfied, the user informing conditions being satisfied depending on the urgency level represented by the urgency level information, and controlling, when determining that the user informing conditions are satisfied, a display of the mobile terminal to display an update object representing that the program instructions are updatable to the new version.

BRIEF DESCRIPTION OF THE ACCOMPANYING DRAWINGS

FIG. 2 shows an example of an informing determination table included in a mobile application stored in the mobile terminal, in the illustrative embodiment according to one or more aspects of the present disclosure.

DETAILED DESCRIPTION

It is noted that various connections are set forth between elements in the following description. It is noted that these connections in general and, unless specified otherwise, may be direct or indirect and that this specification is not intended to be limiting in this respect. Aspects of the present disclosure may be implemented on circuits (such as application specific integrated circuits) or in computer software as programs storable on computer-readable media including but not limited to RAMs, ROMs, flash memories, EEPROMs, CD-media, DVD-media, temporary storage, hard disk drives, floppy drives, permanent storage, and the like.

Hereinafter, an illustrative embodiment according to aspects of the present disclosure will be described with reference to the accompanying drawings.

(1) General Overview of Image Processing System

Figure 1:
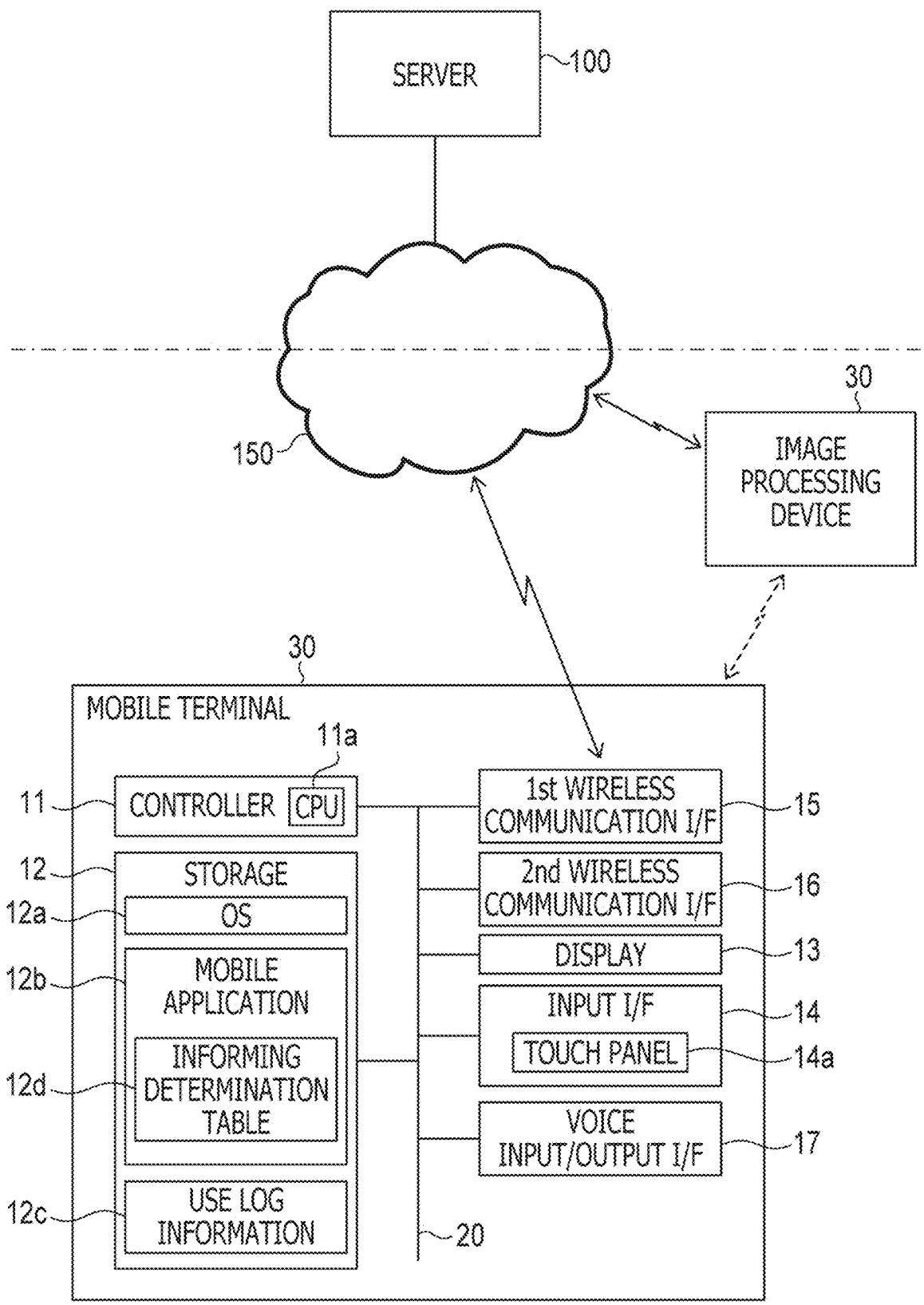
FIG. 1 is a block diagram schematically showing a configuration of an image processing system including a mobile terminal, an image processing device, and a server interconnected via a network, in an illustrative embodiment according to one or more aspects of the present disclosure.

As shown in FIG. 1, an image processing system 1 of the illustrative embodiment includes a mobile terminal 10, an image processing device 30, and a server 100. The mobile terminal 10 is wirelessly connected with a network 150, and is configured to perform data communication with the image processing device 30 and the server 100 via the network 150. Nonetheless, the mobile terminal 10 may be wirelessly communicable with the image processing device 30 without connecting the network 150.

The network 150 may be configured in any connection manner. For instance, the network 150 may include an Internet and a wireless relay device. In this case, the server 100 and the wireless relay device may be connected with the Internet. Further, the image processing device 30 may be wirelessly communicable with the wireless relay device, and may be configured to perform data communication with the mobile terminal 10 and the server 100 via the wireless relay device. The image processing device 30 may be connectable with the Internet via wired communication.

(2) Configuration of Image Processing Device

In the illustrative embodiment, the image processing device 30 is configured to process various types of image data in various processing manners. The image processing device 30 has a plurality of functions such as a scanning function, a printing function, a copy function, and a facsimile function. The scanning function is a function to scan an image of a document and generate image data of the scanned image. The printing function is a function to print an image based on image data onto a recording sheet. The copy function is a function to print an image scanned with the scanning function by using the printing function. The facsimile function is a function to send and receive facsimile data containing image data.

The image processing device 30 includes a microcomputer including a CPU and a memory. The memory stores data and programs for achieving the above functions. Each of the above functions is performed by the CPU executing one or more relevant programs stored in the memory. Nonetheless, all the above functions may not necessarily be performed by the CPU executing the relevant programs, but at least one of the functions may be performed by one or more hardware elements such as application specific integrated circuits.

The image processing device 30 may be controlled by a below-mentioned mobile application 12b incorporated in the mobile terminal 10. In other words, a user of the mobile terminal 10 may provide an instruction to perform an intended one of the available functions to the image processing device 30 by using the mobile application 12b of the mobile terminal 10.

(3) Configuration of Mobile Terminal

Figure 3:
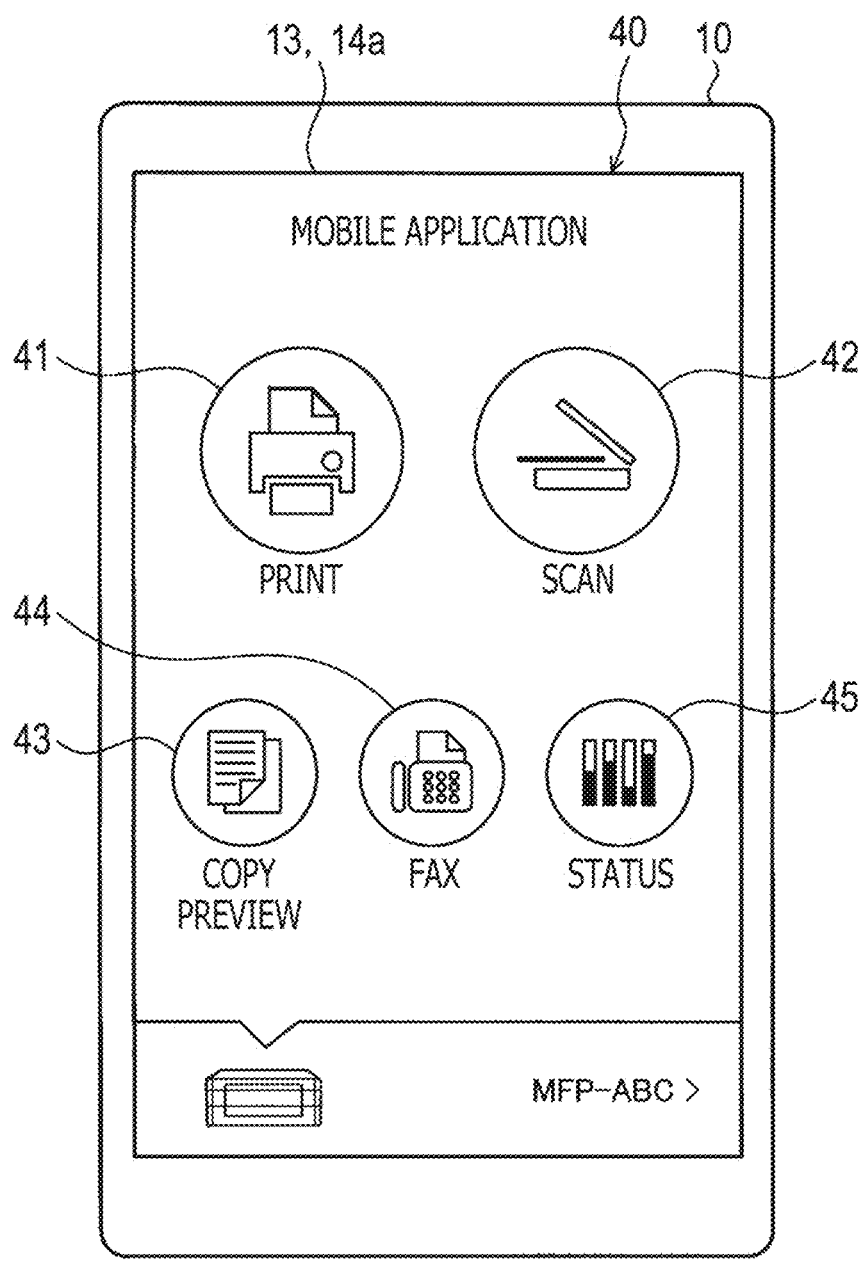
FIG. 3 shows an example of an application start screen displayed on the mobile terminal, in the illustrative embodiment according to one or more aspects of the present disclosure.
Figure 4:
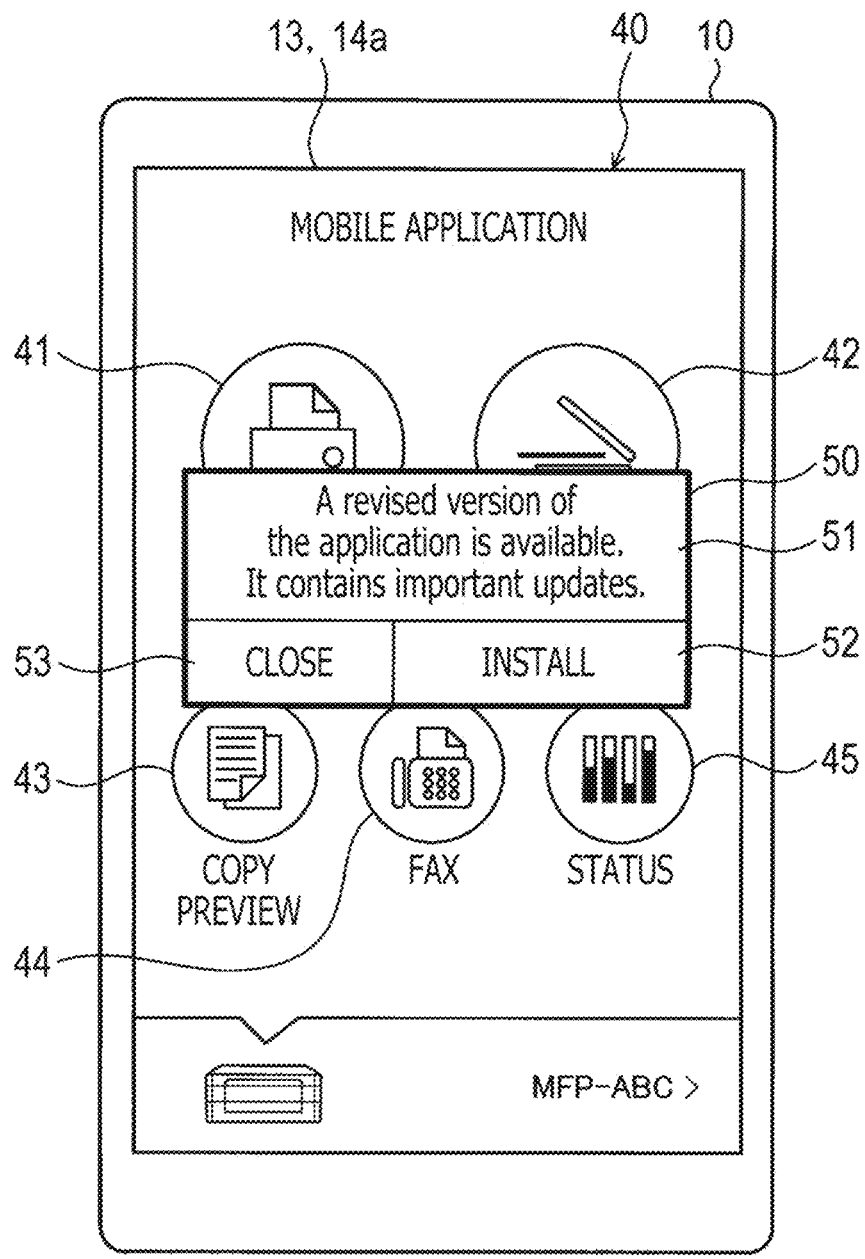
FIG. 4 shows an example of the application start screen on which an update dialog is displayed, in the illustrative embodiment according to one or more aspects of the present disclosure.
Figure 5:
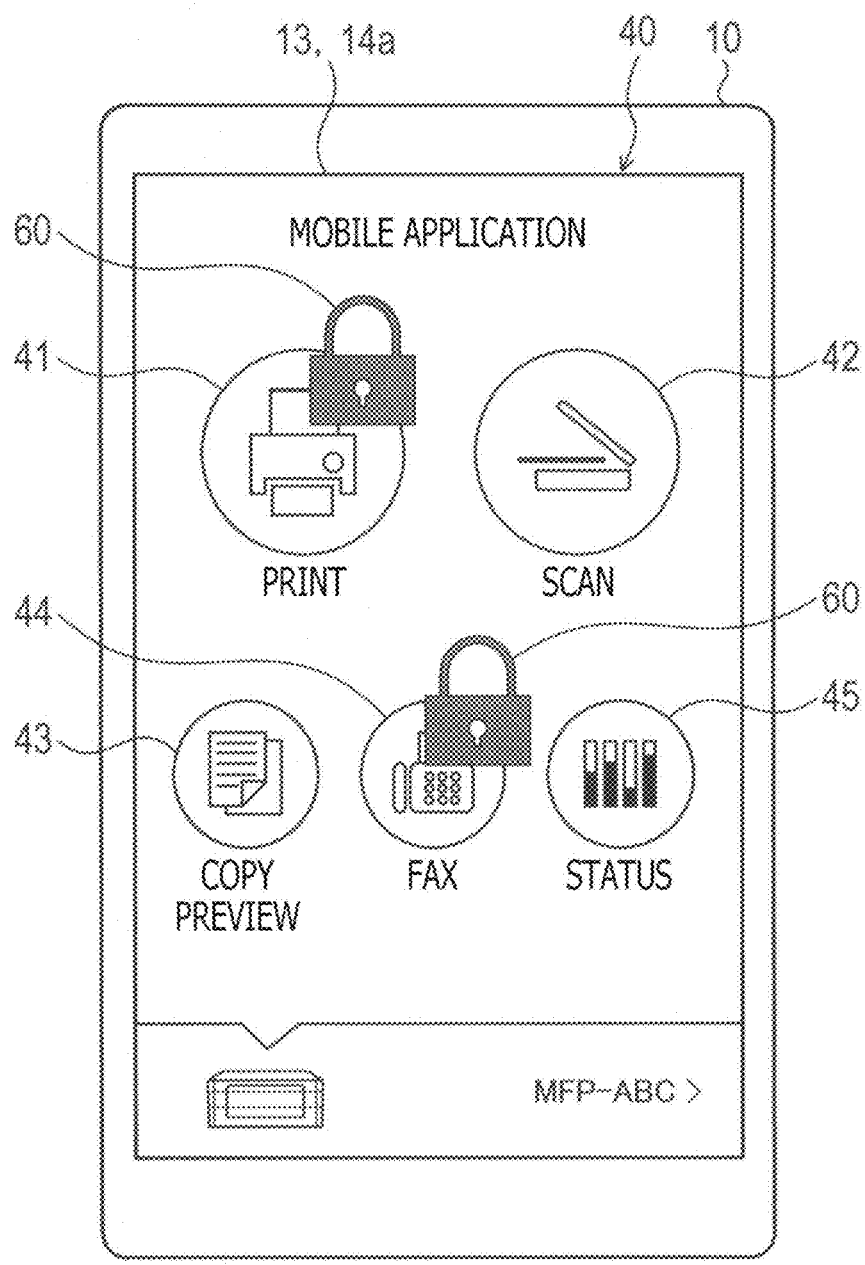
FIG. 5 shows an example of the application start screen on which function locked marks are displayed, in the illustrative embodiment according to one or more aspects of the present disclosure.

The mobile terminal 10 is a mobile communication terminal (e.g., a smartphone and a tablet terminal) wirelessly communicable with external devices. FIGS. 3 to 5 are front views of the mobile terminal 10.

The mobile terminal 10 includes a controller 11, a storage 12, a display 13, an input I/F ("I/F" is an abbreviation of "interface") 14, a first wireless communication I/F 15, a second wireless communication I/F 16, and a voice input/output I/F 17. These elements included in the mobile terminal 10 are interconnected via a bus line 20, so as to perform data communication with each other.

For instance, the controller 11 may include a CPU 11a. For instance, the storage 12 may include one or more semiconductor memories such as a ROM, a RAM, an NVRAM, and a flash memory. Namely, the mobile terminal 10 of the illustrative embodiment may include a microcomputer including the CPU 11a and the one or more semiconductor memories.

The controller 11 is configured to perform various functions by executing relevant programs stored in a non-transitory computer-readable storage medium. In the illustrative embodiment, the storage 12 may be or include the non-transitory computer-readable storage medium. It is noted that the controller 11 may not necessarily perform all of the various functions by executing software programs, but may perform at least one of the various functions by using one or more hardware elements.

The storage 12 stores various types of data and software programs such as an OS 12a and the mobile application 12b. The mobile application 12b contains an informing determination table 12d (see FIG. 2). The OS 12a and the mobile application 12b are installed into a computer system including the controller 11. Further, use log information 12c is stored into the storage 12 by the mobile application 12b.

In the following description, the controller 11 (more specifically, the CPU 11a) executing a program may be simply referred to as a name of the program. For instance, "the mobile application 12b" may represent "the CPU 11a executing the mobile application 12b."

The mobile application 12b is application software configured to control the image processing device 30. For instance, the mobile application 12b may be downloaded from a server managed by a vendor of the image processing device 30. The user may install the downloaded mobile application 12b into the mobile terminal 10 and may use various functions via the mobile application 12b executed on the mobile terminal 10.

The various functions (hereinafter referred to as "mobile functions") available via the mobile application 12b include a mobile printing function, a mobile scanning function, a mobile copy preview function, a mobile facsimile function, and a mobile status checking function.

The mobile printing function is a function to send image data stored in the mobile terminal 10 to the image processing device 30 and cause the image processing device 30 to print an image represented by the image data.

The mobile scanning function is a function to send an instruction to scan an image of a document and setting values necessary for scanning the image of the document from the mobile terminal 10 to the image processing device 30 and cause the image processing device 30 to scan the image of the document in accordance with the setting values.

The mobile copy preview function is a function to, when the image processing device 30 performs the copy function, receive from the image processing device 30 print data containing image data representing a scanned image and display on the display 13 a preview image corresponding to the image represented by the received print data. The preview image represents a state of the image expected to be actually printed on a recording sheet in accordance with the print data.

The mobile facsimile function is a function to send image data stored in the mobile terminal 10 to the image processing device 30 and cause the image processing device 30 to transmit facsimile data containing the image data to a specified destination.

The mobile status checking function is a function to send a request for status information representing various statuses of the image processing device 30 from the mobile terminal 10 to the image processing device 30, then receive, as a response to the request, the status information from the image processing device 30, and display the received status information on the display 13.

The mobile application 12b is configured to perform the mobile functions by sending to and receiving from the image processing device 30 various types of data necessary for the mobile functions. The mobile application 12b may be an exclusive application only for controlling a specific model of devices. However, in the illustrative embodiment, the mobile application 12b is configured to control different models of devices including the image processing device 30 shown in FIG. 1. It is noted that, in the present disclosure, "devices" may represent devices and apparatuses configured to process image data.

It is noted that commands, to be sent as needed to a control target device before the mobile terminal 10 performs the mobile functions via the mobile application 12b, may be different depending on a model of the control target device. The display 13 includes a display device (e.g., an LCD device or an organic EL display device) configured to display images thereon.

The input I/F 14 includes one or more input devices configured to receive various input operations. The one or more input devices include a touch panel 14a laid on a display area of the display device included in the display 13.

The touch panel 14a is configured to detect an indicating operation of putting an indicator into contact with or into proximity to the display area of the display device. More specifically, the touch panel 14a is configured to, while the indicating operation is being performed, continuously or periodically output positional information representing a position indicated by the indicator on the display area of the display device.

It is noted that the touch panel 14a may be configured to detect, as the indicating operation, at least one of an operation of putting the indicator into contact with the display area and an operation of putting the indicator into proximity to the display area.

The controller 11 obtains the positional information output from the touch panel 14a and detects, based on the obtained positional information, whether the indicating operation using the indicator is being performed. In addition, when determining that the indicating operation is being performed, the controller 11 further detects a position where the indicating operation is being performed, and at least one of particular types of operations detectable as the indicating operation.

The particular types of operations detectable by the controller 11 may include, but are not limited to, tapping, flicking, and dragging. The tapping is an operation of, after the indicating operation is performed, separating the indicator away from the display area in the same position. Examples of the indictor may include, but are not limited to, fingers and particular indicating devices such as styluses.

The first wireless communication I/F 15 is configured to perform wireless communication, for instance, via a wireless LAN. Specifically, in the illustrative embodiment, the first wireless communication I/F 15 is configured to perform wireless LAN communication compliant with IEEE 802.11b/g/n standards. The mobile terminal 10 may perform wireless LAN communication with the image processing device 30 via the first wireless communication I/F 15.

For instance, the first wireless communication I/F 15 may include a communication interface for performing wireless communication compliant with Bluetooth (registered trademark) standards. Hereinafter, "Bluetooth" may be referred to as "BT." In addition, or in another instance, the first wireless communication I/F 15 may include a communication interface for performing wireless communication compliant with BLE ("BLE" is abbreviation of "Bluetooth Low Energy") standards. In addition, or in another instance, the first wireless communication I/F 15 may include a communication interface for performing near field wireless communication compliant with NFC ("NFC" is abbreviation of "Near Field Communication") standards. In addition, or in another instance, the first wireless communication I/F 15 may include a communication interface for performing wireless communication compliant with communication standards other than the aforementioned standards.

The mobile functions may be implementable via any of the aforementioned communication interfaces (i.e., via wireless communication compliant with any of the aforementioned standards).

The second wireless communication I/F 16 is configured to perform voice communication or data communication via a mobile communication network (not shown). For instance, the second wireless communication I/F 16 may be configured to perform LTE-compliant wireless communication. It is noted that "LTE" is an abbreviation of "Long Term Evolution."

The voice input/output I/F 17 includes voice input/output devices such as a microphone and a speaker.

(4) Functions of Server

The server 100 is managed, for instance, by a vendor of the mobile application 12b. For instance, when the mobile application 12b has been revised by the vendor to fix a bug found in the mobile application 12*b*, the server 100 sends, to each of the information processing devices with the mobile application 12*b* installed, an update notification representing that the mobile application 12*b* is updatable to the revised version.

In the illustrative embodiment, the server 100 sends the update notification, for instance, as a push notification. The "push notification" denotes a framework that makes it possible to send a notification to the mobile application 12*b* even when the mobile application 12*b* is not activated as well as when the mobile application 12*b* is activated. In the illustrative embodiment, after the mobile terminal 10 receives an update notification for the mobile application 12*b* from the server 100, the OS 12*a* first processes the update notification and then provides the update notification to the mobile application 12*b*.

(5) Mobile Application (5-1) General Overview of Functions of Mobile Application In the illustrative embodiment, when a device is registered with the mobile application 12*b*, the mobile functions are available for controlling the registered device. Namely, when the image processing device 30 is registered with the mobile application 12*b*, it is possible to use the mobile functions for controlling the image processing device 30 via the mobile application 12*b* in execution on the mobile terminal 10. The following description will be provided under an assumption that the image processing device 30 is registered with the mobile application 12*b* and that the image processing device 30 is set as a control target to be controlled via the mobile application 12*b*.

When the mobile application 12*b* is launched, an application start screen 40 (see FIG. 3) is displayed on the display 13. The application start screen 40 includes a print icon 41, a scan icon 42, a copy preview icon 43, a fax icon 44, and a status icon 45.

In FIG. 3, "MFP-ABC" displayed on the application start screen 40 represents a model of the image processing device 30. The mobile application 12*b* is configured to accept a plurality of devices registered therewith. In a case where two or more devices are registered with the mobile application 12*b*, for instance, when a user selects one of the registered devices as a control target device, the user is allowed to use the mobile functions to control the selected device via the mobile application 12*b*. It is noted that the user may not necessarily be required to register a device with the mobile application 12*b* in order to use the mobile functions to selectively control the device via the mobile application 12*b*. For instance, the user may perform a particular setting operation different from registering the device and thereby control the device selectively via the mobile application 12*b*.

The print icon 41 is associated with the mobile printing function. When the print icon 41 is selected (e.g., when the print icon 41 is tapped), the mobile application 12*b* performs the mobile printing function. Specifically, the mobile application 12*b* causes the display 13 to display an image selecting screen (not shown) for prompting the user to select an image to be printed. When the user selects an image via the image selecting screen, the mobile application 12*b* causes the display 13 to display a preview screen (not shown). When the user performs an instructing operation to instruct the image processing device 30 to perform printing while the preview screen is being displayed, the mobile application 12*b* transmits to the image processing device 30 a print command containing image data representing the selected image. Thereby, the selected image is printed by the image processing device 30.

The scan icon 42 is associated with the mobile scanning function. When the scan icon 42 is selected, the mobile application 12*b* performs the mobile scanning function. Specifically, the mobile application 12*b* causes the display 13 to display a scan setting screen (not shown). On the scan setting screen, setting values for scan setting items necessary for causing the image processing device 30 to scan documents are displayed. By checking the scan setting screen, the user may understand what setting values are set for document scanning by the image processing device 30. Further, the user may separately change the setting values by performing a particular setting change operation to the scan setting screen. When the user performs an instructing operation to instruct the image forming apparatus 30 to perform document scanning while the scan setting screen is being displayed, the mobile application 12*b* transmits to the image processing device 30 a scan command containing setting values currently set for the scan setting items. Thus, the image processing device 30 performs document scanning in accordance with the setting values received from the mobile terminal 10.

The copy preview icon 43 is associated with the mobile copy preview function. When the copy preview icon 43 is selected, the mobile application 12*b* performs the mobile copy preview function.

The fax icon 44 is associated with the mobile facsimile function. When the fax icon 44 is selected, the mobile application 12*b* performs the mobile facsimile function.

The status icon 45 is associated with the mobile status checking function. When the status icon 45 is selected, the mobile application 12*b* performs the mobile status checking function.

The mobile application 12*b* further has a use log storing function and an update control function. The use log storing function is a function to, when one of the mobile functions is performed, store the use log information 12*c* into the storage 12. The use log information 12*c* contains used-device information and control time information associated with each other. The used-device information represents a control target device controlled to perform the one of the mobile functions. The control time information represents a time at or during which the control target device performed the one of the mobile functions.

The control time information may be any type of information representing a time at or during which one of the mobile functions was performed. For instance, the control time information may represent a date at which one of the mobile functions was performed. In another instance, the control time information may represent a particular period of time including a date at which one of the mobile functions was performed. Further, the control time information may be obtained in any method. In the illustrative embodiment, for instance, the control time information is obtained based on an output signal from a real-time clock (not shown) incorporated in the mobile terminal 10.

The update control function is a function to, when receiving from the server 100 the update notification representing that the mobile application 12*b* is updatable, update the mobile application 12*b* based on the received update notification. In the illustrative embodiment, as described above, the update notification is transmitted as a push notification from the server 100, and is provided to the mobile application 12*b* via the OS 12*a*.

The mobile application 12*b* may be revised by the vendor for various reasons. For instance, the mobile application 12*b* may be revised to fix a bug found in a program module for controlling all of the devices controllable via the mobile application 12b. In another instance, the mobile application 12b may be revised to fix a bug found in a command or a program module exclusively for controlling a particular one of the controllable devices.

When the mobile application 12b is revised to fix a bug found in a command or a program module exclusively for controlling a particular device, a user who does not use the particular device does not necessarily require the mobile application 12b to be updated to the revised version.

Further, even though the mobile application 12b is revised to fix a bug found in a command or a program module for controlling a particular device, a user who uses the particular device may not necessarily require the mobile application 12b to be soon updated to the revised version. For instance, when a problem that might be caused if the mobile application 12b is not updated is generally deemed to have little influence on actual use of the particular device, the user may wish to leave the mobile application 12b un-updated in consideration of troublesome operations for updating the mobile application 12b.

Namely, even though receiving the update notification from the server 100, the mobile application 12b may not necessarily be required to inform the user of the received update notification, depending on what kind of information is contained in the update notification and/or usage conditions under which the mobile application 12b is used by the user.

Hence, in the illustrative embodiment, when receiving the update notification, the mobile application 12b does not unconditionally inform the user of the received update notification, but, as will be described more specifically, informs the user of the update notification when user informing conditions are satisfied.

(5-2) Outline of Update Notification

The update notification received from the server 100 contains information representing that the mobile application 12b is updatable, a notification type, an urgency level, update-influenced device information, dialog display information, prohibited-function information, and version information.

Each of the notification type and the urgency level represents a degree of urgency. The notification type indicates one of a plurality of different notification types. The plurality of different notification types include "NORMAL BUG" and "URGENT BUG." The "NORMAL BUG" represents that the mobile application 12b is not urgently required to be updated. The "URGENT BUG" represents that the mobile application 12b is urgently required to be updated. In the illustrative embodiment, the update notification contains one of the "NORMAL BUG" and the "URGENT BUG" as the notification type.

The user is informed of the urgency level when the notification type is the "URGENT BUG." In the illustrative embodiment, the urgent level indicates one of a plurality of different urgent levels such as "HIGH," "MIDDLE," and "LOW." The "HIGH" represents a highest level of urgency at which it is highly recommended to update the mobile application 12b as soon as possible. The "MIDDLE" represents a lower level of urgency than the "HIGH." The "LOW" represents a lower level of urgency than the "MIDDLE."

Namely, when the notification type is the "URGENT BUG" representing that the mobile application 12b is urgently required to be updated, the user is informed of the urgency level as one of sub-divisional urgency levels of the "URGENT BUG." It is noted that when the notification type is the "NORMAL BUG," the mobile application 12b is less urgently required to be updated than when the notification type is the "URGENT BUG." Therefore, the "NORMAL BUG" is deemed to represent a lower level of urgency than the "LOW" in the case where the notification type is the "URGENT BUG."

The update-influenced device information represents one or more update-influenced devices that are influenced by a program module revised by updating of the mobile application 12b, among the devices controllable via the mobile application 12b. The one or more update-influenced devices are devices that, when controlled via the mobile application 12b after the mobile application 12b has been updated, are influenced by the update of the mobile application 12b. For instance, in the update notification representing that the mobile application 12bis updatable to a revised version in which only a program module exclusively for controlling a particular device has been revised, the update-influenced device information representing the particular device is contained. In another instance, in the update notification representing that the mobile application 12b is updatable to a revised version that has influences on all of the devices controllable via the mobile application 12b, the update-influenced device information representing all of the controllable devices is contained. In this case, all of the devices controllable via the mobile application 12b are update-influenced devices.

The dialog display information is for displaying a below-mentioned update dialog 50 (see FIG. 4). The update dialog 50 is for informing the user that the update notification has been received from the server 100.

As shown in FIG. 4, the update dialog 50 includes an update message 51, an "INSTALL" button 52, and a "CLOSE" button 53. The update message 51 is for informing the user of updatability of the mobile application 12b and importance of the update. The "INSTALL" button 52 and the "CLOSE" button 53 are disposed beneath the update message 51. The "INSTALL" button 52 and the "CLOSE" button 53 are arranged side by side along a left-to-right direction in FIG. 4. Specifically, the "INSTALL" button 52 is adjacent to a right side of the "CLOSE" button 53.

The update dialog 50 is generated and displayed based on the dialog display information contained in the update notification. Specifically, the dialog display information contains a text included in each of the update message 51, the "INSTALL" button 52, and the "CLOSE" button 53. The dialog display information further contains information representing a position and a size of each of the update message 51, the "INSTALL" button 52, and the "CLOSE" button 53 displayed on the application start screen 40. Thus, the mobile application 12b generates and displays the update dialog 50 based on the dialog display information contained in the update notification.

The prohibited-function information represents one or more functions that are influenced by a program module revised by updating of the mobile application 12b, among the mobile functions executable via the mobile application 12b. For instance, in the illustrative embodiment, when a particular program module related to a particular function among all the modules of the mobile application 12b needs to be revised, the update notification contains the prohibited-function information representing the particular function, thereby prohibiting the user from using the particular function until the particular program module is revised by updating of the mobile application 12b.

When receiving the update notification containing the prohibited-function information, the mobile application 12b sets invalid the one or more functions (hereinafter referred to as "prohibited functions") represented by the prohibited-function information until the mobile application 12b is updated in accordance with the update notification. For instance, in this case, a function-locked mark 60 is displayed superimposed on an icon of each prohibited function, as shown in FIG. 5.

FIG. 5 shows an example in which the function-locked marks 60 are displayed superimposed on the print icon 41 and the fax icon 44 in response to receipt of the update notification representing that program modules related to the mobile printing function and the mobile facsimile function need to be revised. Namely, in this example, the update notification contains the prohibited-function information representing the mobile printing function and the mobile facsimile function as the prohibited functions. The mobile application 12b causes the display 13 to display the function-locked marks 60 superimposed on the print icon 41 and the fax icon 44, based on the prohibited-function information.

When the function-locked mark 60 is displayed superimposed on an icon, a user operation to select the icon is rendered invalid. Namely, in the example shown in FIG. 5, user operations to select the print icon 41 and the fax icon 44 are rendered invalid. Therefore, even when the print icon 41 or the fax icon 44 is selected, a corresponding mobile function is not performed.

The function-locked mark 60 may be an image having any shape, and may be displayed in any position relative to the associated icon. The function-locked mark 60 may not superimposed on the associated icon. The version information represents a version of the updated mobile application 12b.

(5-3) User Informing Conditions

The mobile application 12b is configured to receive an update informing setting by the user. The user may set the update informing setting to one of "ON," "OFF," and "IN CASE OF URGENCY ONLY."

When the update informing setting is set to "ON," each time receiving the update notification, irrespective of contents of the update notification, the mobile application 12b informs the user that the update notification has been received, for instance, by displaying the update dialog 50 as shown in FIG. 4.

When the update dialog 50 is displayed, the user who saw the update dialog 50 realizes that the mobile application 12b is updatable and how important the update is. When the "CLOSE" button 53 is selected while the update dialog 50 is being displayed, the update dialog 50 is deleted without the mobile application 12b being updated. Meanwhile, when the "INSTALL" button 52 is selected, the mobile application 12b is updated. For instance, in the illustrative embodiment, the mobile application 12b may access the server 100, then download a revised version of the mobile application 12b, and update the mobile application 12b to the revised version.

In another instance, the server 100 may be configured to send the revised version of the mobile application 12b as well when sending the update notification. Namely, the mobile terminal 10 may receive the revised version of the mobile application 12b as well when receiving the update notification from the server 100. In this case, when the "INSTALL" button 52 of the update dialog 50 is selected, the mobile application 12b is updated to the revised version already received. Further, the mobile application 12b may be updated to the revised version by the mobile application 12b itself. In another instance, the mobile application 12b may be updated to the revised version by an installer. In this case, the installer may be included in the revised version of the mobile application 12b.

When the update informing setting is set to "OFF," even though receiving the update notification, the mobile application 12b does not inform the user that the update notification has been received. When the update informing setting is set to "IN CASE OF URGENCY ONLY," in response to receiving the update notification, the mobile application 12b determines whether the user informing conditions are satisfied. Then, when determining that the user informing conditions are satisfied, the mobile application 12b informs the user that the update notification has been received, by displaying the update dialog 50.

In the illustrative embodiment, the user informing conditions are determined to be satisfied when all of the following conditions A to D are fulfilled.

The condition A: The notification type is "URGENT BUG."
The condition B: The version of the mobile application 12b currently installed in the mobile terminal 10 is older than the version represented by the version information contained in the update notification.
The condition C: Device requirements are fulfilled. Specifically, at least one update-influenced device is registered with the mobile application 12b, and is contained in the use log information 12c in a case where the urgency level is "MIDDLE" or "LOW."
The condition D: An informing needed level is equal to or higher than a particular level (e.g., a level of "2").

To determine whether the condition D is fulfilled, the mobile application 12b has the informing determination table 12d as shown in FIG. 2. The informing determination table 12b defines a plurality of different informing needed levels in association with a combination of the urgency level and information as to whether there is a use log of an update-influenced device used via the mobile application 12b within a particular period of time.

For instance, on the informing determination table 12d shown in FIG. 2, for the urgency level "HIGH," the informing needed level is set to "3" regardless of whether there is a use log of an update-influenced device used within a particular period of time. For the urgency level "MIDDLE," the informing needed level is set to "3" when there is a use log of an update-influenced device used within a first particular period of time before the update notification has been received. Further, for the urgency level "MIDDLE," the informing needed level is set to "2" when there is not a use log of an update-influenced device used within the first particular period of time. In the illustrative embodiment, the first particular period of time is a period of time from an update-notified time when the update notification has been received to one year earlier than the update-notified time.

For the urgency level "LOW," the informing needed level is set to "3" when there is a use log of an update-influenced device used within a second particular period of time before the update notification has been received. In the illustrative embodiment, the second particular period of time is a period of time from the update-notified time to one month earlier than the update-notified time. Further, for the urgency level "LOW," the informing needed level is set to "2" when there is a use log of an update-influenced device used within the first particular period of time. Meanwhile, for the urgency level "LOW," the informing needed level is set to "1" when there is not a use log of an update-influenced device used within the first particular period of time.

Namely, the informing determination table 12d is configured to have a higher informing needed level for a higher urgency level and to have a higher informing needed level for a shorter period of time between the update-notified time and a last time when an update-influenced device was used via the mobile application 12*b* before the update-notified time. The aforementioned condition D is determined with reference to the informing determination table 12*d*.

(6) Notification Information Receiving Process

Figure 6:
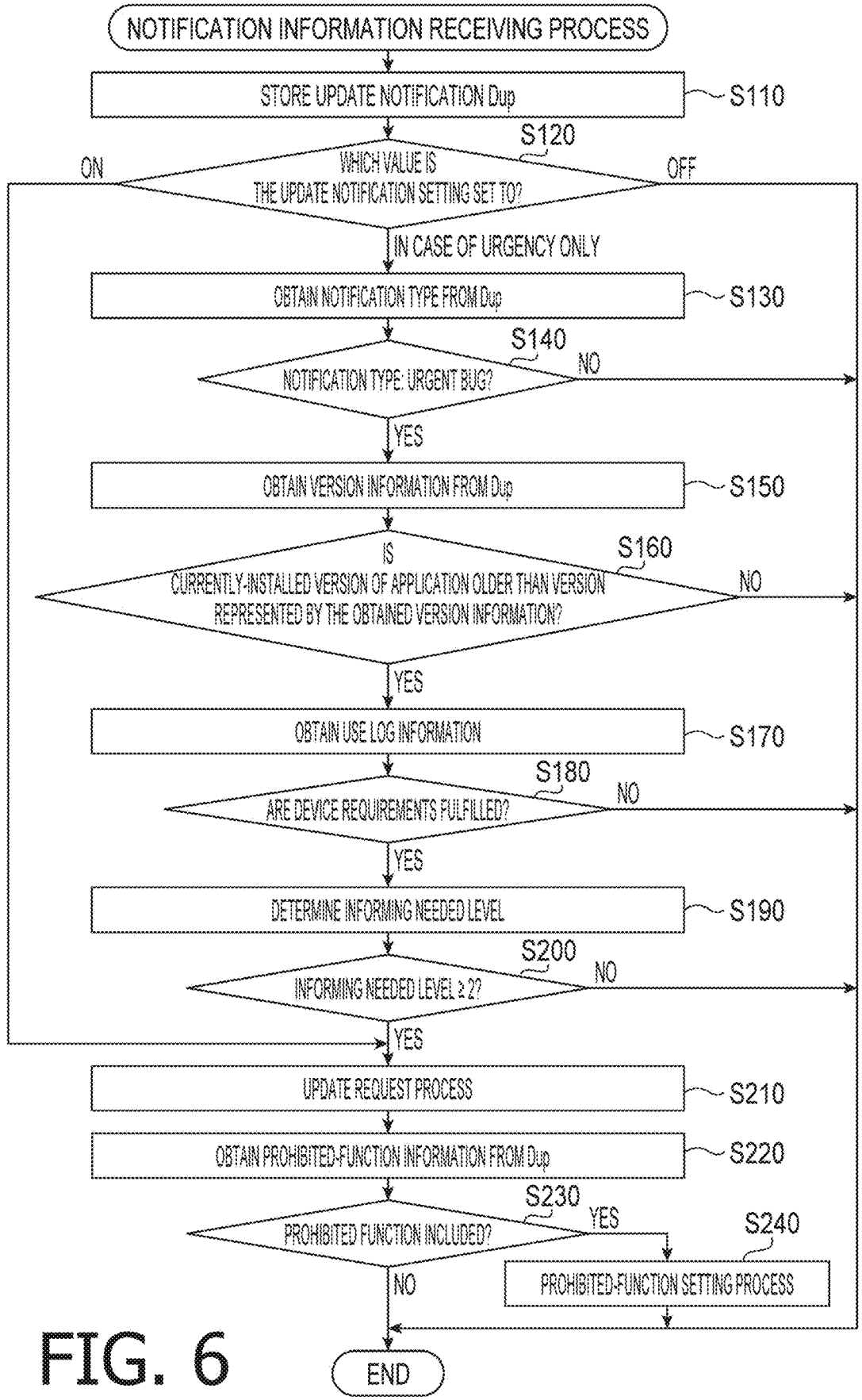
FIG. 6 is a flowchart showing a procedure of a notification information receiving process to be performed by the mobile terminal executing the mobile application, in the illustrative embodiment according to one or more aspects of the present disclosure.

Subsequently, a notification information receiving process will be described with reference to FIG. 6. The notification information receiving process shown in FIG. 6 is performed by the controller 11 of the mobile terminal 10 in accordance with the mobile application 12*b*. The notification information receiving process is one of the processes to be performed via the mobile application 12*b*. The controller 11, which is executing the mobile application 12*b*, starts performing the notification information receiving process in response to receiving the update notification from the server 100 via the OS 12*a*.

After starting the notification information receiving process, in S110, the controller 11 stores into the storage 12 an update notification Dup received via the OS 12*a*. In S120, the controller 11 determines to which value the update informing setting is set. When determining that the update informing setting is set to "OFF" (S120: OFF), the controller 11 terminates the notification information receiving process. When determining that the update informing setting is set to "ON" (S120: ON), the controller 11 goes to S210.

In S210, the controller 11 performs an update request process. Specifically, the controller 11 sets an update flag to "ON." In S220, the controller 11 obtains prohibited-function information from the update notification Dup. In S230, the controller 11 determines whether the prohibited-function information includes a prohibited function. When determining that the prohibited-function information does not include a prohibited function (S230: No), the controller 11 terminates the notification information receiving process. When determining that the prohibited-function information includes a prohibited function (S230: Yes), the controller 11 goes to S240 and performs a prohibited-function setting process. Specifically, in S240, the controller 11 sets a prohibited-function flag to "ON."

When determining that the update informing setting is set to "IN CASE OF URGENCY ONLY" (S120: IN CASE OF URGENCY ONLY), the controller 11 goes to S130. In S130, the controller 11 obtains a notification type from the update notification Dup. In S140, the controller 11 determines whether the obtained notification type is "URGENT BUG." The determination in S140 corresponds to the determination as to whether the aforementioned condition A is fulfilled. When determining that the obtained notification type is not "URGENT BUG" (S140: No), the controller 11 terminates the notification information receiving process. Meanwhile, when determining that the obtained notification type is "URGENT BUG" (S140: Yes), the controller 11 goes to S150.

In S150, the controller 11 obtains version information from the update notification Dup. In S160, the controller 11 determines whether a version of the mobile application 12*b* currently installed in the mobile terminal 10 is older than a version represented by the obtained version information. The determination in S160 corresponds to the determination as to whether the aforementioned condition B is fulfilled. When determining that the version of the mobile application 12*b* currently installed in the mobile terminal 10 is not older than the version represented by the obtained version information (S160: No) (i.e., when the currently-installed mobile application 12*b* has already been updated to the latest version), the controller 11 terminates the notification information receiving process. Meanwhile, when determining that the version of the mobile application 12*b* currently installed in the mobile terminal 10 is older than the version represented by the obtained version information (S160: Yes), the controller 11 goes to S170.

In S170, the controller 11 obtains the use log information 12*c*. In S180, the controller 11 determines whether the device requirements are fulfilled. The determination in S180 corresponds to the determination as to whether the aforementioned condition C is fulfilled. When determining that the device requirements are not fulfilled (S180: No), i.e., when an update-influenced device is not registered with the mobile application 12*b*, or an update-influenced device is not contained in the use log information 12*c* in the case where the urgency level is "MIDDLE" or "LOW," the controller 11 terminates the notification information receiving process. Meanwhile, when determining that the device requirements are fulfilled (S180: Yes), the controller 11 goes to S190.

In S190, the controller 11 determines the informing needed level with reference to the informing determination table 12*d* shown in FIG. 2. For instance, when the urgency level of the update notification Dup is "MIDDLE," and an update-influenced device has been used via the mobile application 12*b* within the last one year, the informing needed level is "3."

In S200, the controller 11 determines whether the informing needed level determined in S190 is equal to or higher than a particular level (e.g., the level "2"). The determination in S200 corresponds to the determination as to whether the aforementioned condition D is fulfilled. When determining that the informing needed level determined in S190 is lower than the particular level (S200: No), the controller 11 terminates the notification information receiving process. Meanwhile, when determining that the informing needed level determined in S190 is equal to or higher than the particular level (S200: Yes), the controller 11 goes to S210 and sets the update flag to "ON."

(7) Main Process

Figure 7A:
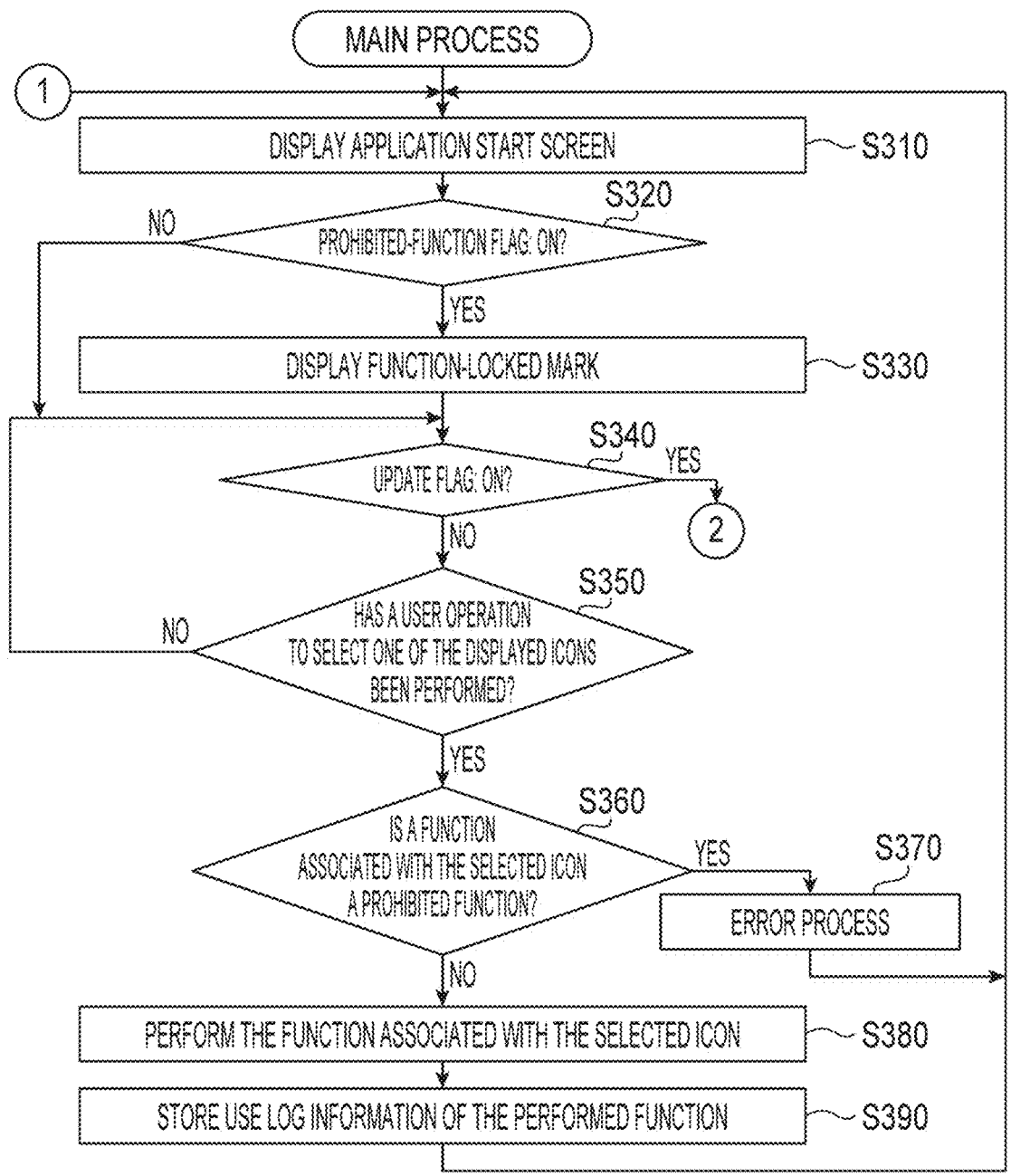
FIGS. 7A and 7B are flowcharts showing a procedure of a main process to be performed by the mobile terminal executing the mobile application, in the illustrative embodiment according to one or more aspects of the present disclosure.
Figure 7B:
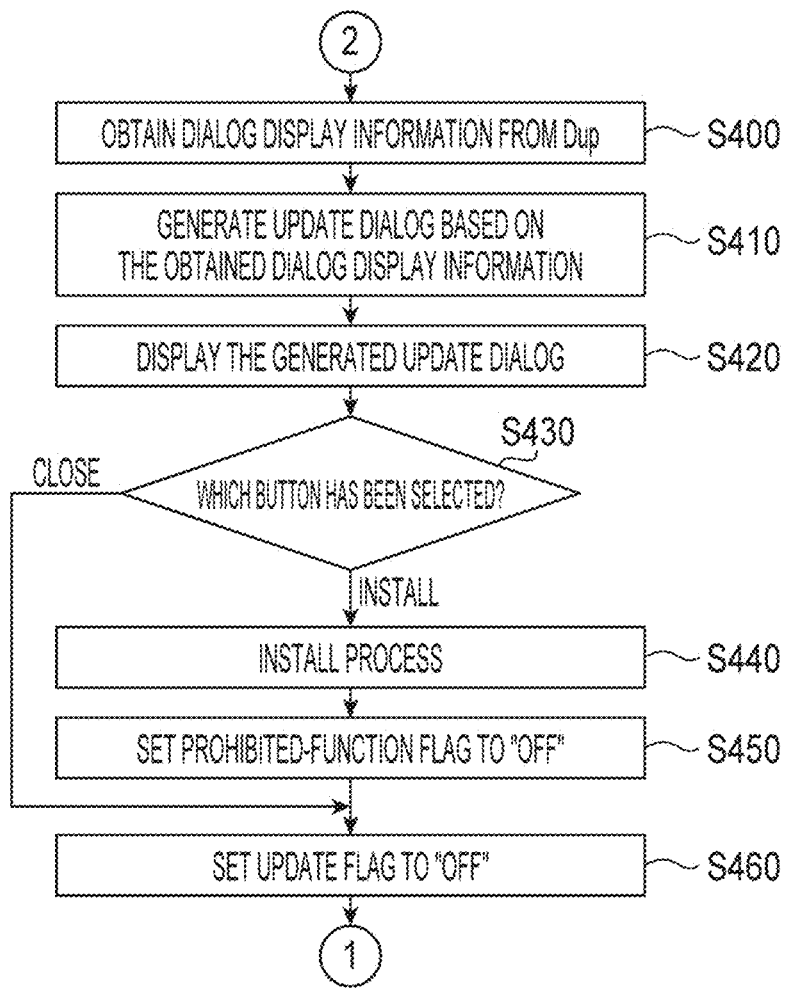

Subsequently, a main process will be described with reference to FIGS. 7A and 7B. The main process is performed by the controller 11 of the mobile terminal 10 in accordance with the mobile application 12*b*. The main process is one of the processes executable via the mobile application 12*b*. The controller 11 starts performing the main process in response to the user performing a particular start operation. The notification information receiving process shown in FIG. 6 is performed in parallel with the main process. In other words, the notification information receiving process and the main process are performed in a multitasking manner.

After starting the main process, the controller 11 controls the display 13 to display the application start screen 40 in S310. In S320, the controller 11 determines whether the prohibited-function flag is set to "ON." When determining that the prohibited-function flag is set to "OFF" (S320: No), the controller 11 goes to S340. When determining that the prohibited-function flag is set to "ON" (S320: Yes), the controller 11 goes to S330. In S330, the controller 11 controls the display 13 to display the function-locked mark 60 superimposed on an icon associated with the corresponding prohibited function. After S330, the controller 11 goes to S340.

In S340, the controller 11 determines whether the update flag is set to "ON." When determining that the update flag is set to "OFF" (S340: No), the controller 11 goes to S350.

In S350, the controller 11 determines whether a user operation to select one of the icons on the application start screen 40 has been performed. When determining that a user operation to select one of the icons on the application start screen 40 has not been performed (S350: No), the controller 11 goes to S340. Meanwhile, when determining that a user operation to select one of the icons on the application start screen 40 has been performed (S350: Yes), the controller 11 goes to S360.

In S360, the controller 11 determines whether a function associated with the selected icon is a prohibited function, based on the prohibited-function information contained in the update notification Dup. When determining that the function associated with the selected icon is a prohibited function (S360: Yes), the controller 11 performs an error process in S370. After S370, the controller 11 goes back to S310. The error process is for informing the user that the function associated with the selected icon is inexecutable. When determining that the function associated with the selected icon is not a prohibited function (S360: No), the controller 11 goes to S380. In S380, the controller 11 performs the function associated with the selected icon. In S390, the controller 11 stores into the storage 12 the use log information 12c of the function performed in S380. After S390, the controller 11 goes to S310.

When determining that the update flag is set to "ON" (S340: Yes), the controller 11 goes to S400. In S400, the controller 11 obtains the dialog display information from the update notification Dup. In S410, the controller 11 generates the update dialog 50 based on the obtained dialog display information. In S420, the controller 11 controls the display 13 to display the update dialog 50 generated in S410 on the application start screen 40 (see FIG. 4).

In S430, the controller 11 determines which button has been selected from between the "INSTALL" button 52 and the "CLOSE" button 53 of the update dialog 50. When the "CLOSE" button 53 has been selected (S430: CLOSE), the controller 11 sets the update flag to "OFF" and then goes to S310. In this case, the application start screen 40 from which the update dialog 50 has been deleted is displayed.

When the "INSTALL" button 52 has been selected (S430: INSTALL), the controller 11 goes to S440. In S440, the controller 11 performs an install process. Specifically, in S440, the controller 11 accesses the server 100, then provides the server 100 with a request for a revised version of the mobile application 12b corresponding to the update notification Dup, and downloads the revised version from the server 100. Thereby, the controller 11 updates the mobile application 12b to the revised version. After S440, the controller 11 sets the prohibited-function flag to "OFF" in S450. Thereafter, the controller 11 goes to S460. In S460, the controller 11 sets the update flag to "OFF."

(8) Advantageous Effects of Illustrative Embodiment

As described above, the illustrative embodiment provides the following advantageous effects. When receiving the update notification in the state where the update informing setting is set to "IN CASE OF URGENCY ONLY," if the user informing conditions are satisfied, the mobile application 12b informs the user that the update notification has been received, without unconditionally informing the user of the received update notification. Therefore, it is possible to appropriately inform the user that the mobile application 12b is updatable and prevent the user from being annoyed when inappropriately informed of the received update notification.

The user informing conditions include the aforementioned conditions A to D. Since the condition A is included in the user informing conditions, when the notification type is "NORMAL BUG," the user is not informed of the received update notification. In other words, the user is informed of the received update notification if the update notification should urgently be delivered to the user, whereas the user is not informed of the received update notification if the update notification should not urgently be delivered to the user. Therefore, it is possible to prevent the user from being annoyed by being informed of non-urgent update notification each time the non-urgent update notification is received.

Further, even when the notification type is "URGENT BUG," i.e., the received update notification should urgently be delivered to the user, the user is not necessarily informed of the update notification. In the illustrative embodiment, the update notification containing a notification type of "URGENT BUG" further contains one of the sub-divisional urgency levels. Then, the informing needed level is determined based on the urgency level. Further, according to the informing needed level, it is determined whether there is a need to inform the user that the update notification has been received. Thus, it is possible to determine more appropriately whether there is a need to inform the user that the update notification has been received (i.e., the mobile application 12b is updatable), in accordance with the informing needed level based on the urgency level.

Further, in the illustrative embodiment, it is determined whether there is a need to inform the user that the update notification has been received, in consideration of, as well as the urgency level, a use log of an update-influenced device used via the mobile application 12b within a particular period of time. Specifically, as shown in FIG. 2, the informing needed level is determined based on a combination of the use log and the urgency level. Thus, it is possible to determine more appropriately whether there is a need to inform the user that the update notification has been received (i.e., the mobile application 12b is updatable), in consideration of both the urgency level and the use log.

Further, in the illustrative embodiment, when one or more update-influenced devices contained in the received update notification are not registered with the mobile application 12b, the user is not informed that the update notification has been received. This is because the mobile application 12b is not necessarily required to be updated in the above case. Thus, as the user is not informed of the received update notification in such a case, it is possible to prevent the user from being annoyed at unnecessary information about the received update notification.

Hereinabove, the illustrative embodiment according to aspects of the present disclosure has been described. Aspects of the present disclosure may be practiced by employing conventional materials, methodology and equipment. Accordingly, the details of such materials, equipment and methodology are not set forth herein in detail. In the previous descriptions, numerous specific details are set forth, such as specific materials, structures, chemicals, processes, etc., in order to provide a thorough understanding of the present disclosure. However, it should be recognized that aspects of the present disclosure may be practiced without reapportioning to the details specifically set forth. In other instances, well known processing structures have not been described in detail, in order not to unnecessarily obscure the present disclosure.

Only an exemplary illustrative embodiment of the present disclosure and but a few examples of their versatility are shown and described in the present disclosure. It is to be understood that aspects of the present disclosure are capable of use in various other combinations and environments and are capable of changes or modifications within the scope of the inventive concept as expressed herein. For instance, the following modifications according to aspects of the present disclosure are feasible.

The user informing conditions may include any kind of condition. For instance, the user informing conditions may include only one or at least two of the aforementioned conditions A to D. In another instance, the user informing conditions may include at least one of the conditions A to D and one or more conditions different from the conditions A to D.

Further, for instance, regarding the condition D based on a combination of the urgency level and the use log, it may be determined whether the condition D is fulfilled, in a method different from the method using the informing determination table 12d (see FIG. 2). For instance, urgency level coefficients a1, a2, and a3 (a1>a2>a3) may be set for the urgency levels "HIGH," "MIDDLE," and "LOW," respectively. Further, with respect to a use log of an update-influenced device used via the mobile application 12b within a particular period of time, use log coefficients b1, b2, and b3 (b1>b2>b3) may be set for different particular periods of time T1, T2, and T3, respectively. It is noted that the particular period of time T1 may be a period of time from the update-notified time when the update notification has been received to one week earlier than the update-notified time. Further, the particular period of time T2 may be a period of time from the update-notified time to one month earlier than the update-notified time. Moreover, the particular period of time T3 may be a period of time from the update-notified time to one year earlier than the update-notified time. Then, when a value obtained by multiplying the urgency level coefficient by the use log coefficient is equal to or more than a particular threshold, the user may be informed that the update notification has been received. Specifically, for instance, when the urgency level is "MIDDLE," and there is a use log of an update-influenced device used within a week before the update notification has been received, a value of an urgency level coefficient a2 multiplied by a use log coefficient b1 may be obtained. Then, when the obtained value is equal to or more than the particular threshold, the user may be informed that the update notification has been received.

The urgency level may be set to one of two different levels or four or more different levels. The particular period of time for classifying a use log of an update-influenced device used before the update notification has been received may be set to a period of time different from "one year" and "one month" as exemplified in the aforementioned illustrative embodiment.

The informing determination table 12d may not be the same as shown in FIG. 2. For instance, for the urgency level "HIGH," a plurality of different informing needed levels may be set depending on a use log of an update-influenced device used before the update notification has been received.

The update notification may be sent from the server 100 to the mobile application 12b in a method different from the push notification.

The update dialog 50 (see FIG. 4) may include any type of information. The update dialog 50 may be displayed in any fashion and in any position on the application start screen 40.

The user may be informed that the update notification has been received, in a method different from displaying the update dialog 50. For instance, the user may be informed of the received update notification by using a sound and/or voice.

A plurality of functions of a single element exemplified in the aforementioned illustrative embodiment may be attained by using a plurality of elements. A single function of a single element exemplified in the aforementioned illustrative embodiment may be attained by using a plurality of elements. Further, a plurality of functions of a plurality of elements exemplified in the aforementioned illustrative embodiment may be attained by using a single element. A single function achieved by using a plurality of elements exemplified in the aforementioned illustrative embodiment may be attained by using a single element. A part of the configuration exemplified in the aforementioned illustrative embodiment may be omitted. Further, at least a part of the elements included in the configuration exemplified in the aforementioned illustrative embodiment may be added to the configurations exemplified in the modifications. At least a part of the elements included in the configuration exemplified in the aforementioned illustrative embodiment may be replaced with elements as exemplified in the modifications.

The following shows examples of associations between elements exemplified in the aforementioned illustrative embodiment and modifications and elements according to aspects of the present disclosure. The mobile terminal 10 may be an example of a "mobile terminal" according to aspects of the present disclosure. The server 100 may be an example of a "server" according to aspects of the present disclosure. The image processing device 30 may be an example of a "device" according to aspects of the present disclosure. The storage 12 may be an example of a "non-transitory computer-readable medium" according to aspects of the present disclosure, and may be an example of a "storage" according to aspects of the present disclosure. The mobile application 12b may be an example of "(computer-readable) program instructions" according to aspects of the present disclosure. The controller 11 may be an example of a "controller" according to aspects of the present disclosure. The display 13 may be an example of a "display" according to aspects of the present disclosure. The first wireless communication I/F 15 may be an example of a "communication interface" according to aspects of the present disclosure. The input I/F 14 may be an example of an "input interface" according to aspects of the present disclosure. The update dialog 50 may be an example of an "update object" according to aspects of the present disclosure. The print icon 41, the scan icon 42, the copy preview icon 43, the fax icon 44, and the status icon 45 may be included in "one or more function objects" according to aspects of the present disclosure. The function-locked mark 60 may be an example of a "prohibited-function object" according to aspects of the present disclosure. The use log information 12c may be an example of a "control log information" according to aspects of the present disclosure. The informing determination table 12d may be an example of an "informing determination table" according to aspects of the present disclosure.

What is claimed is:

1. A non-transitory computer-readable medium storing computer-readable program instructions executable by a controller of a mobile terminal, the mobile terminal comprising a display and a communication interface configured to perform data communication with a server, the program instructions being configured to, when executed by the controller, cause the controller to:

control a device to perform image data processing;

in response to receipt of an update notification from the server via the communication interface, obtain the received update notification, the update notification representing that the program instructions are updatable to a new version and containing urgency level information, the urgency level information representing an urgency level showing how urgently the program instructions need to be updated to the new version;

determine whether user informing conditions concerning the obtained update notification are satisfied, the user informing conditions being satisfied depending on the urgency level represented by the urgency level information; and in response to the user informing conditions being satisfied, control the display to display an update object representing that the program instructions are updatable to the new version;

wherein when the update notification contains prohibited-function information representing at least one function to be prohibited from being controlled via the program instructions until the program instructions are updated, among one or more functions of the device that are controllable via the program instructions, prohibit the at least one function represented by the prohibited-function information contained in the obtained update notification from being controlled until the program instructions are updated.

2. The non-transitory computer-readable medium according to claim 1, wherein the program instructions are further configured to, when executed by the controller, cause the controller to control at least one control target device including the device to perform image data processing, the at least one control target device being specified from among a plurality of types of devices controllable via the program instructions, wherein the update notification contains update-influenced device information representing one or more update-influenced devices that are influenced by updating of the program instructions among the plurality of types of controllable devices, and wherein the user informing conditions include a condition that the at least one control target device is included in the one or more update-influenced devices represented by the update-influenced device information.

3. The non-transitory computer-readable medium according to claim 1, wherein the urgency level information represents one of a plurality of different urgency levels showing how urgently the program instructions need to be updated, and wherein the program instructions are further configured to, when executed by the controller, cause the controller to determine whether the user informing conditions are satisfied, based on the urgency level represented by the urgency level information.

4. The non-transitory computer-readable medium according to claim 1, wherein the mobile terminal further comprises an input interface, and wherein the program instructions are further configured to, when executed by the controller, cause the controller to:

control the display to display one or more function objects associated with the one or more controllable functions, respectively;

control the display to display a prohibited-function object to specify the at least one function represented by the prohibited-function information, in a state where the one or more function objects are being displayed on the display; and in response to receiving a selection from among the one or more function objects via the input interface, control the device to perform a function associated with the selected function object unless the selected function is included in the at least one function specified by the prohibited-function object.

5. A non-transitory computer-readable medium storing computer-readable program instructions executable by a controller of a mobile terminal, the mobile terminal comprising a display, a storage and a communication interface configured to perform data communication with a server, the program instructions being configured to, when executed by the controller, cause the controller to:

control a device to perform image data processing;

in response to receipt of an update notification from the server via the communication interface, obtain the received update notification, the update notification representing that the program instructions are updatable to a new version and containing urgency level information, the urgency level information representing an urgency level showing how urgently the program instructions need to be updated to the new version;

determine whether user informing conditions concerning the obtained update notification are satisfied, the user informing conditions being satisfied depending on the urgency level represented by the urgency level information;

in response to the user informing conditions being satisfied, control the display to display an update object representing that the program instructions are updatable to the new version; and control at least one control target device including the device to perform image data processing, the at least one control target device being specified from among a plurality of types of devices controllable via the program instructions, wherein the update notification contains update-influenced device information representing one or more update-influenced devices that are influenced by updating of the program instructions among the plurality of types of controllable devices, and wherein the user informing conditions include a condition that the at least one control target device is included in the one or more update-influenced devices represented by the update-influenced device information, wherein after controlling each control target device, store control log information into the storage, the control log information containing the at least one control target device each associated with a control time when each control target device was controlled to perform image data processing, and wherein the user informing conditions include a condition that an update-influenced device, among the one or more update-influenced devices represented by the update-influenced device information, is contained in the control log information and was controlled to perform image data processing within a particular period of time before the receipt of the update notification.

6. The non-transitory computer-readable medium according to claim 5, wherein the urgency level information represents one of a plurality of different urgency levels showing how urgently the program instructions need to be updated, and wherein the program instructions are further configured to, when executed by the controller, cause the controller to determine whether the user informing conditions are satisfied, based on the urgency level represented by the urgency level information and the control time associated with the update-influenced device in the control log information stored in the storage.

7. The non-transitory computer-readable medium according to claim 6,
wherein the storage stores an informing determination table containing a plurality of different informing needed levels showing to what degree a user needs to be informed that the program instructions are updatable to the new version, each of the informing needed levels being associated with a combination of a particular one of the different urgency levels and a particular control time when an update-influenced device, among the one or more update-influenced devices represented by the update-influenced device information, is controlled to perform image data processing before the receipt of the update notification, and
wherein the user informing conditions include a condition that a specified one of the different informing needed levels is equal to or higher than a particular level, the specified informing needed level being associated with a combination of the urgency level represented by the urgency level information and the control time associated with the update-influenced device in the control log information.

8. The non-transitory computer-readable medium according to claim 7,
wherein the informing determination table is configured to have a higher informing needed level for a higher urgency level and to have a higher informing needed level for a shorter period of time between the receipt of the update notification and a last control time when an update-influenced device, among the one or more update-influenced devices represented by the update-influenced device information, was controlled to perform image data processing before the receipt of the update notification.

9. A mobile terminal comprising:
a display;
a communication interface configured to perform data communication with a server;
a storage storing program instructions; and
a controller configured to, when executing the program instructions, perform:
controlling a device to perform image data processing;
in response to receipt of an update notification from the server via the communication interface, obtaining the received update notification, the update notification representing that the program instructions are updatable to a new version and containing urgency level information, the urgency level information representing an urgency level showing how urgently the program instructions need to be updated to the new version;
determining whether user informing conditions concerning the obtained update notification are satisfied, the user informing conditions being satisfied depending on the urgency level represented by the urgency level information; and
in response to the user informing conditions being satisfied, controlling the display to display an update object representing that the program instructions are updatable to the new version;
wherein when the update notification contains prohibited-function information representing at least one function to be prohibited from being controlled via the program instructions until the program instructions are updated, among one or more functions of the device that are controllable via the program instructions, prohibit the at least one function represented by the prohibited-function information contained in the obtained update notification from being controlled until the program instructions are updated.

10. The mobile terminal according to claim 9,
wherein the controller is further configured to, when executing the program instructions, control at least one control target device including the device to perform image data processing, the at least one control target device being specified from among a plurality of types of devices controllable via the program instructions,
wherein the update notification contains update-influenced device information representing one or more update-influenced devices that are influenced by updating of the program instructions among the plurality of types of controllable devices, and
wherein the user informing conditions include a condition that the at least one control target device is included in the one or more update-influenced devices represented by the update-influenced device information.

11. The mobile terminal according to claim 10,
wherein the controller is further configured to, when executing the program instructions, store control log information into the storage after controlling each control target device, the control log information containing the at least one control target device each associated with a control time when each control target device was controlled to perform image data processing, and
wherein the user informing conditions include a condition that an update-influenced device, among the one or more update-influenced devices represented by the update-influenced device information, is contained in the control log information and was controlled to perform image data processing within a particular period of time before the receipt of the update notification.

12. The mobile terminal according to claim 11,
wherein the urgency level information represents one of a plurality of different urgency levels showing how urgently the program instructions need to be updated, and
wherein the controller is further configured to, when executing the program instructions, determine whether the user informing conditions are satisfied, based on the urgency level represented by the urgency level information and the control time associated with the update-influenced device in the control log information stored in the storage.

13. The mobile terminal according to claim 12,
wherein the storage stores an informing determination table containing a plurality of different informing needed levels showing to what degree a user needs to be informed that the program instructions are updatable to the new version, each of the informing needed levels being associated with a combination of a particular one of the different urgency levels and a particular control time when an update-influenced device, among the one or more update-influenced devices represented by the update-influenced device information, is controlled to perform image data processing before the receipt of the update notification, and wherein the user informing conditions include a condition that a specified one of the different informing needed levels is equal to or higher than a particular level, the specified informing needed level being associated with a combination of the urgency level represented by the urgency level information and the control time associated with the update-influenced device in the control log information.

14. The mobile terminal according to claim 13,
wherein the informing determination table is configured to have a higher informing needed level for a higher urgency level and to have a higher informing needed level for a shorter period of time between the receipt of the update notification to a last control time when an update-influenced device, among the one or more update-influenced devices represented by the update-influenced device information, was controlled to perform image data processing before the receipt of the update notification.

15. The mobile terminal according to claim 9,
wherein the urgency level information represents one of a plurality of different urgency levels showing how urgently the program instructions need to be updated, and
wherein the controller is further configured to, when executing the program instructions, determine whether the user informing conditions are satisfied, based on the urgency level represented by the urgency level information.

16. The mobile terminal according to claim 9, further comprising an input interface,
wherein the controller is further configured to, when executing the program instructions, perform:
controlling the display to display one or more function objects associated with the one or more controllable functions, respectively;
controlling the display to display a prohibited-function object to specify the at least one function represented by the prohibited-function information, in a state where the one or more function objects are being displayed on the display; and
in response to receiving a selection from among the one or more function objects via the input interface, controlling the device to perform a function associated with the selected function object unless the selected function is included in the at least one function specified by the prohibited-function object.

17. A method implementable on a controller of a mobile terminal in accordance with program instructions stored in a storage of the mobile terminal, the method comprising:
controlling a device to perform image data processing;
in response to receipt of an update notification from a server via a communication interface of the mobile terminal, obtaining the received update notification, the update notification representing that the program instructions are updatable to a new version and containing urgency level information, the urgency level information representing an urgency level showing how urgently the program instructions need to be updated to the new version;
determining whether user informing conditions concerning the obtained update notification are satisfied, the user informing conditions being satisfied depending on the urgency level represented by the urgency level information; and
in response to the user informing conditions being satisfied, controlling a display of the mobile terminal to display an update object representing that the program instructions are updatable to the new version;
wherein when the update notification contains prohibited-function information representing at least one function to be prohibited from being controlled via the program instructions until the program instructions are updated, among one or more functions of the device that are controllable via the program instructions, prohibit the at least one function represented by the prohibited-function information contained in the obtained update notification from being controlled until the program instructions are updated.

* * * * *